(12) United States Patent
Boscolo

(10) Patent No.: US 8,970,150 B2
(45) Date of Patent: Mar. 3, 2015

(54) APPARATUS FOR DETECTING THE POSITION OF A ROTOR OF AN ELECTRIC MOTOR AND RELATED METHOD

(75) Inventor: Michele Berto Boscolo, Sottomarina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 761 days.

(21) Appl. No.: 13/242,847

(22) Filed: Sep. 23, 2011

(65) Prior Publication Data

US 2012/0098474 A1    Apr. 26, 2012

(30) Foreign Application Priority Data

Oct. 22, 2010   (IT) .................. MI2010A1942

(51) Int. Cl.
  *H02P 1/04*    (2006.01)
  *H02P 6/20*    (2006.01)
  *H02P 6/18*    (2006.01)
(52) U.S. Cl.
  CPC ........ *H02P 6/20* (2013.01); *H02P 6/185* (2013.01); *H02P 2203/11* (2013.01)
  USPC ............ 318/400.33; 318/400.31; 318/400.32; 318/700

(58) Field of Classification Search
  USPC ............... 318/400.31, 400.32, 400.33, 700
  See application file for complete search history.

(56) References Cited

U.S. PATENT DOCUMENTS

| | | | |
|---|---|---|---|
| 4,978,895 A * | 12/1990 | Schwarz | 318/400.04 |
| 6,011,368 A | 1/2000 | Kalpathi et al. | |
| 6,841,903 B2 | 1/2005 | Boscolo et al. | |
| 6,859,000 B2 * | 2/2005 | Kessler et al. | 318/400.06 |
| 7,956,561 B2 * | 6/2011 | Kanamori et al. | 318/400.06 |
| 2004/0113576 A1 | 6/2004 | Heidrich | |
| 2010/0109589 A1* | 5/2010 | Harada | 318/400.33 |
| 2010/0181952 A1 | 7/2010 | Cheng | |
| 2011/0248658 A1* | 10/2011 | O'Gorman et al. | 318/400.32 |

* cited by examiner

*Primary Examiner* — Kawing Chan
(74) *Attorney, Agent, or Firm* — Seed IP Law Group PLLC

(57) ABSTRACT

An apparatus detects the position of a rotor of an electric motor having three phases and a plurality of windings. The apparatus includes circuitry configured to connect at least two of said windings between first and second reference voltages according to a first current path disconnect said at least two windings, and allow the current stored in said two windings to be discharged through a second current path. The apparatus comprises a measuring circuit configured to measure the time period between the starting instant of storing the current in the two windings and the final instant of discharging the two windings and a rotor detector configured to detect the rotor position based at least in part on the measured time period.

19 Claims, 7 Drawing Sheets

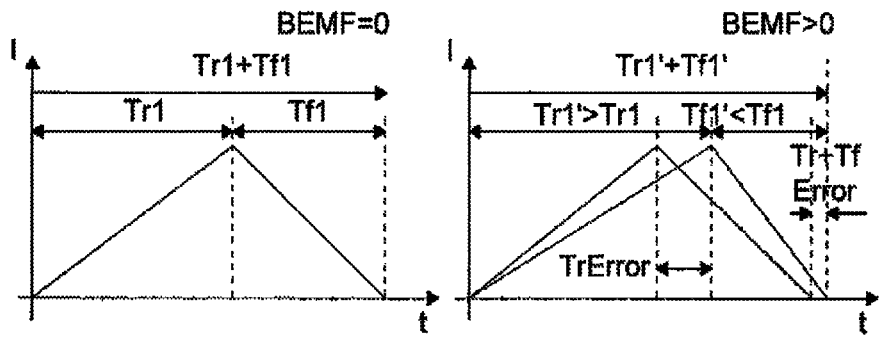
*FIG. 3*    *FIG. 4*
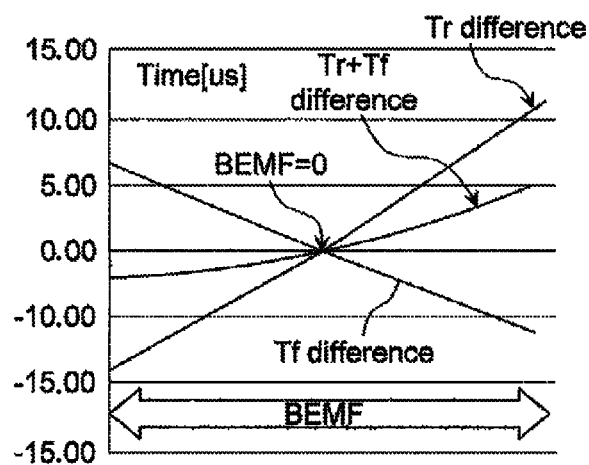
*FIG. 5*

APPARATUS FOR DETECTING THE POSITION OF A ROTOR OF AN ELECTRIC MOTOR AND RELATED METHOD

BACKGROUND

1. Technical Field

The present disclosure relates to an apparatus for detecting the position of a rotor of an electric motor, in particular a brushless motor, and to the related method.

The present disclosure permits to optimize the procedure of detecting or identifying the position of the rotor, in particular in sensorless brushless motors typically used as spindle motors in hard disks, CDs, DVDs, etc.

2. Description of the Related Art

The identification procedure, normally called "inductive sense", takes advantage of the different response of the current in the motor winding with respect to a voltage pulse applied to the ends of the windings of the motor itself. The knowledge of the rotor position permits to optimize the motor startup procedure and is therefore a very important factor. The procedures of identifying the rotor position should therefore be characterized by high performances in terms of precision and insensitivity to disturbances.

Indeed an error in detecting the rotor position results in an imprecise excitation sequence of the stator phases and in a consequent efficiency reduction or, in the worst case, in a failure of the motor startup procedure (loss of synchronism).

The methods of detecting the rotor position (inductive sense) of known art only ensure good performances under conditions of a stopped rotor or while rotating at very low speed, i.e., under all those conditions in which the effect of the back electromotive force (BEMF) may be considered negligible.

Many startup techniques exist, some completely executed in open loop (startup in open loop) while in others, a detection of the rotor is indirectly used for generating the driving sequence, i.e., in closed loop (startup in closed loop).

The methods commonly used for detecting the position of the rotor at very low speeds (or stopped) are based on the analysis of the current in the windings upon a voltage pulse applied to the windings themselves. The principle is based on the phenomenon of magnetic saturation which is affected by the position of the permanent rotor magnet and which modifies in turn the profile of the current. Therefore, by analyzing the current, i.e., by analyzing the rise time Tr or the fall time Tf upon the application of a voltage step, the position of the rotor may be unambiguously determined, and therefore the stator phases may be excited to generate a torque of suitable value. The sequence of "identification step" (inductive sense) and "excitement step" (torque generation) permits to take the rotor to a speed such as to make the back electromotive force (BEMF) detectable. When BEMF reaches sufficiently high values, the startup procedure is considered concluded. Since then, the rotor position is extrapolated by directly analyzing the BEMF signal and no longer from the inductive sense procedure.

The inductive sense procedures are based on a comparison of certain parameters, typically the duration to reach a fixed current threshold, i.e., the rise time Tr, or the duration required to discharge the current circulating in the motor windings, i.e., the fall time Tf. In these cases the result is affected by the errors made in the individual measurements, since it is based on the comparison of various measurements made in sequence.

U.S. Pat. No. 6,841,903 describes a method for detecting the position of a rotor in a DC motor having N phases and a plurality of windings, comprising the steps of: connecting at least two of the windings between first and second prefixed voltages according to a first current path over a prefixed time; permitting the current stored in the two windings to be discharged by means of a second current path; comparing the voltage at the ends of one of the two windings with a third prefixed voltage and supplying a control signal when the voltage has an absolute value lower than a third prefixed voltage; performing the above-indicated steps for each of the pairs of motor windings; detecting the rotor position according to the control signals obtained.

The typical problem of an inductive sense procedure is that of the precision in the case wherein the motor moves, i.e., when the back electromotive force (BEMF) is not null or at least negligible. Under these conditions, the current pulses are modified by the presence of BEMF, thus generating an error when detecting the rotor position. Therefore, in the known art systems, a maximum limit of BEMF (and therefore of speed) exists, which may not be overcome if the desired precision and reliability in detecting the position of the rotor is to be ensured.

BRIEF SUMMARY

One embodiment of the present disclosure is an apparatus for detecting the position of a rotor of an electric motor, in particular a brushless motor, which overcomes the drawbacks of known apparatuses. With the apparatus in accordance with the disclosure, the problem of the position error generated by BEMF is minimized, thus ensuring the precision of the estimation of the rotor position for higher rotation speeds with respect to this which may be obtained, by using the known art inductive sense methods.

One embodiment of the present disclosure is an apparatus for detecting the position of a rotor of an electric motor, said electric motor having three phases, said apparatus comprising a plurality of windings and means for connecting at least two of said windings between first and second reference voltages according to a first current path, means for disconnecting said at least two windings and means for allowing the current stored in said two windings to be discharged through a second current path, characterized in that it comprises means adapted to measure the time period between the start instant of storing the current in the two windings and the final instant of discharging the current in the two windings, means for performing the aforesaid operations for each pair of motor windings, means for detecting the rotor position according to said measured time periods.

BRIEF DESCRIPTION OF THE SEVERAL VIEWS OF THE DRAWINGS

The features and advantages of the present disclosure will become apparent from the following detailed description of practical embodiments thereof, shown by way of non-limiting examples in the accompanying drawings, in which:

FIG. 3 shows the time diagrams of the rise and fall time of the current pulse I obtained when Von=VCC and Voff=−(VCC+2 Vbe) and when BEMF=0;

FIG. 4 shows the time diagrams of the rise and fall time of the current pulse I obtained when Von=VCC and Voff=−(VCC+2 Vbe) and when BEMF>0;

FIG. 5 shows the time diagrams of the differences of rise time periods Tr, fall time periods Tf, and sum periods Tr+Tf when BEMF=0 and those when BEMF is other than zero, referred to the current pulse I as a function of the BEMF when Von=VCC and Voff=−(VCC+2 Vbe);

DETAILED DESCRIPTION

Figure 1:
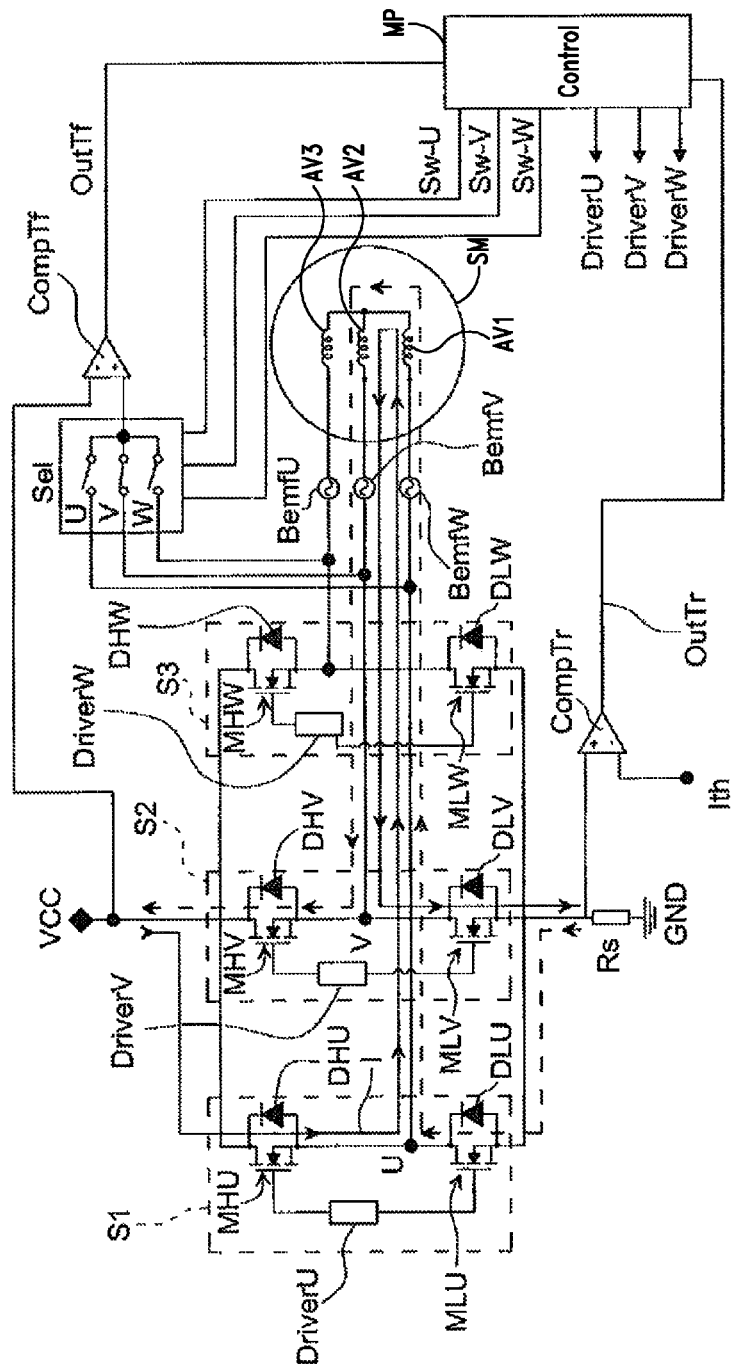
FIG. 1 shows the partial diagram of a driving circuit of a brushless motor with an apparatus for detecting the position of the rotor of the brushless motor according to a first embodiment of the present disclosure.

FIG. 1 shows an apparatus for detecting the position of a rotor of an electric motor, in particular a brushless motor SM, according to an embodiment of the present disclosure; the electric motor is of the N-phase type, preferably having three phases. The apparatus comprises the half-bridges S1, S2 and S3 for controlling the brushless motor SM comprising a rotor; FIG. 1 shows the stator of the electric motor SM with the three star-connected phases U, V and W which include windings AV1, AV2, and AV3, respectively. Each of the half-bridges consists of a "high side" transistor and a low side transistor, each with the associated recirculating diode, indicated respectively by MHU, MLU and DHU, DLU for the half-bridge S1, and MHV, MLV and DHV, DLV for the half-bridge S2 and MHW, MLW and DHW, DLW for the half-bridge S3. The high-side transistors have their drain terminal connected to the positive power supply voltage terminal VCC while the low-side transistors have the source terminal connected to each other and to ground GND, preferably by means of a resistor Rs. The source terminal of each high-side transistor is connected to the drain of each low-side transistor, the connection point of the half-bridge S1 corresponds to the phase U and is connected to a terminal of the winding AV1, the connection point of the half-bridge S2 corresponds to the phase V and is connected to a terminal of the winding AV2, and the connection point of the half-bridge S3 corresponds to the phase W and is connected to a terminal of winding AV3. The other terminals of the windings AV1, AV2 and AV3 are connected to one another. These windings diagrammatically depict a 3-phase spindle motor SM.

The gate terminals of the transistors of the half-bridges S1-S3 are connected to driving circuits DriverU, DriverV, DriverW, respectively, which are configured to suitably power the phases U, V and W of the motor SM. The driving circuits DriverU, DriverV, DriverW are controlled by a control device MP. The voltages of back electromotive force (or BEMF) BemfU, BemfV and BemfW are at the terminals of the windings AV1, AV2 and AV3.

The positive input terminal of a comparator CompTr, a negative input terminal of which a threshold voltage Ith is applied, is connected to resistor Rs. The output OutTr of comparator CompTr is connected to the control circuit MP.

The positive input terminal of a comparator CompTf is connected, by a selector Sel comprising of three switches, to the three phases U, V, W of the motor SM while the negative input terminal is connected to the power supply voltage terminal VCC. The output OutTf of comparator CompTf is connected to the control circuit Mp, which also provides the commands Sw-U, Sw-V and Sw-W to selector Sel.

The apparatus in FIG. 1 uses the sensing resistor Rs for measuring the current circulating in the windings during the excitation step, i.e., for calculating the rise time Tr, while it uses the voltage drop at the terminals of the current recirculating diodes, connected in parallel to the transistors of the half-bridges S1-S3, for measuring the discharge or fall time Tf. However other methods for measuring the time periods Tr and Tf are applicable, the apparatus in the figure is therefore to be considered merely exemplary.

If we consider, for example, the excitation of the phases U and V, indicated as U-V, the control circuit MP conveniently commands the circuits DriverU and DriverV. In particular, circuit DriverU provides for turning on the transistor MHU of the half-bridge S1 while circuit DriverV provides for turning on the transistor MLV of the half-bridge S2. The current I will circulate through the windings AV1 and AV2 and may be measured by means of the sensing resistor Rs. For the whole time the voltage at the ends of resistor Rs, corresponding to the current I circulating in the windings, is below the set threshold Ith, the output OutTr of the comparator CompTr will be at the logic state "0". As soon as the voltage across the resistor Rs reaches the set threshold Ith the output OutTr of the comparator CompTr will be brought to the logic level "1". Upon reaching the voltage threshold Ith, the power stage S1-S3 is immediately turned off (condition of high impedance) by means of the control circuit MP and the process of discharging current I starts.

Figure 2:
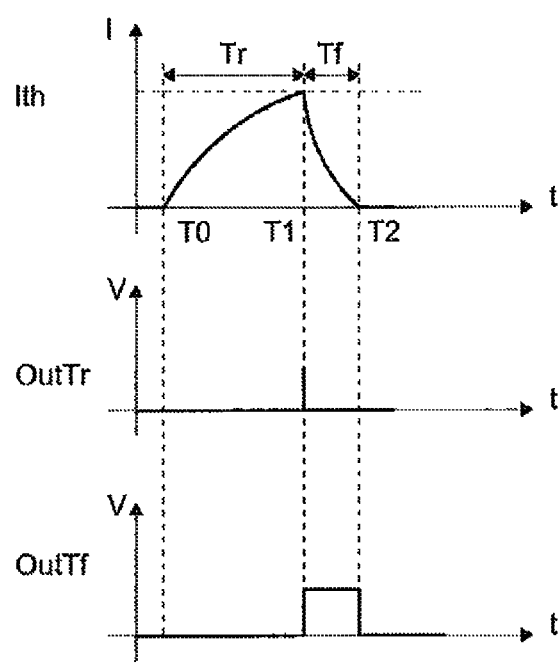
FIG. 2 shows the time diagrams of the rise and fall time of a current pulse I which circulates in a pair of motor windings.

As soon as the power stage S1-S3 is placed under conditions of high impedance, the current at the terminals of the resistor Rs inverts the direction by taking back the output of the comparator CompTr to the logic state "0". The duration of the time period Tr is given by the time elapsing from the moment T0 when the phase excitation is started and the moment T1 when the signal OutTr takes the logic level "1", as shown in FIG. 2.

In the instant T1 when the voltage at the ends of resistor Rs (corresponding to the current flowing through the windings) reaches the threshold Ith, the power stage is forced into high impedance and the discharging process of current I starts. The current will circulate in resistor Rs in the opposite direction with respect to what occurred during the excitation step, and will circulate through two diodes: one diode connected in parallel to a low-side transistor and one diode connected in parallel to a high-side transistor of the power stage S1-S3. Considering the excitation of the phases U-V, for example, the result will be that, for the entire duration of the current discharge, i.e., over the time period Tf, diode DHV and diode DLU will be conducting. During the time period Tf, the voltage of phase V will take a value higher than the power supply voltage VCC while the voltage of phase U will take a value lower than the ground voltage GND due to the voltage drop at the ends of the conducting diodes. By using a comparator CompTf the condition in which the voltage in phase V is greater than VCC (V>VCC) may be detected, accordingly the instant of time T2 may be detected and the duration of the discharge time Tf given by T2-T1 may be measured, as shown in FIG. 2. Again in FIG. 2, the current impulse I circulating in phase UV of motor SM may be seen.

As the excited phases change, obviously the diodes involved during the current discharge step change. Accordingly, the selector SEL allows the comparator CompTf to be connected to the correct terminal. In particular:

during the excitation of phase U-V, the selector SEL connects the comparator CompTf to the terminal V;
during the excitation of phase W-V, the selector SEL connects the comparator CompTf to the terminal V;
during the excitation of phase W-U, the selector SEL connects the comparator CompTf to the terminal U;
during the excitation of phase V-U, the selector SEL connects the comparator CompTf to the terminal U;
during the excitation of phase V-W, the selector SEL connects the comparator CompTf to the terminal W;
during the excitation of phase U-W, the selector SEL connects the comparator CompTf to the terminal W.

The determination of the rotor position is based on that the winding impedance depends on the rotor position. For this reason and in particular for a motor having three phases U, V and W, current I is sequentially passed trough the following pairs of phases U-V, U-W, V-W, V-U, W-U, W-V, and the time period Ttot is measured, for each pair of phases, where Ttot=Tr+Tf and the control circuit MP performs the suitable calculations for determining the rotor position.

The advantage of the apparatus shown in FIG. 1 is in that each variation in the duration of the time period Tr by the BEMF is compensated by the variation of the time period Tf and vice versa. That is, if BEMF has a polarity such as to reduce the rise time Tr of a current impulse I, likewise the fall time Tf of the same impulse will tend to increase and vice versa. Therefore, by measuring the total duration Ttot of the current impulse Ttot=Tr+Tf an automatic compensation is obtained for the effect introduced by BEMF.

The above-described method does not always permit a significant increase of the performances because the charge time and discharge time are not typically well equalized and therefore the variations introduced by BEMF are different in percentage. The compensation introduced by using the sum of rise time Tr and fall time Tf is thus not always optimal. The different duration of Tr and Tf is due to the load type with non-linear characteristic and to the different voltage which is typically used when charging (charge voltage Von) and discharging (discharge voltage Voff) the current I.

The charging step is indeed typically obtained by applying the power supply voltage VCC (Von=VCC) to the pair of windings involved, e.g., windings AV1 and AV2, while the discharging step is typically obtained by forcing the pair of windings involved (e.g., AV1 and AV2 again) into high impedance, i.e., by forcing a voltage Voff=−(VCC+2 Vbe) where Vbe is the voltage at the ends of a current recirculating diode connected in parallel to each power transistor; the charge voltage Von and the discharge voltage Voff may take other values. In these cases, the difference between the charge and discharge voltages is not negligible and therefore the modulations of Tr and Tf due to the BEMF differently act in percentage. FIG. 3 indicates an example of current impulse I obtained when Von=VCC and Voff=−(VCC+2 Vbe) in which the charge and discharge of the current was considered linear.

FIG. 3 depicts the current impulse in the absence of BEMF characterized by a rise time Tr1 and by a fall time Tf1 (when Tr1>Tf1) while FIG. 4 depicts the same current impulse I under conditions of BEMF>0 characterized by a rise time Tr1' and by a fall time Tf1' (when Tr1'>>Tf1'). FIG. 4 shows how the difference between Tr1 and Tr1' (Tr error) is greater than the difference between Tr1+Tf1 and Tr1'+Tf1' (Tr+Tf error). The BEMF effects are therefore decreased by using the quantity Tr+Tf as a computation parameter instead of the simple Tr or Tf.

FIG. 5 depicts the graph with the differences pattern of rise time period Tr, fall time period Tf, and sum Tr+Tf when BEMF=0 and those when BEMF is other than zero, according to the BEMF, if Von=VCC and Voff=−(VCC+2 Vbe). In the example, for simplicity, it is considered the case of function I/t of the linear load having a current charge time Tr=100 us under conditions of BEMF=0. From the graph, the single variation of Tr and Tf, indicated as Tr_difference and Tf_difference, is noted to be rather high whereas the variation of the sum Tr+Tf, indicated as Tr+Tf_difference, is smaller.

Alternatively the charge voltage Von and the discharge voltage Voff may be the same according to the absolute value. In such a case, Von=VCC and Voff=−VCC. Thereby, better performance is obtained as compared to Von=VCC and Voff=−(VCC+2 Vbe), but the greater the function I/t of the load departs from linearity, the greater is the error, i.e., it is worse for high currents.

Again alternatively the charge voltage Von and discharge voltage Voff applied to a pair of windings of the motor SM may be modified ad hoc. To minimize the error introduced by BEMF, the charge time Tr and discharge time Tf may be made as equal as possible (in the absence of BEMF), thereby the variations of Tr and Tf by the BEMF will be better balanced. By applying an equal charge and discharge voltages, the discharge time Tf is always faster than the charge time Tr (when BEMF=0) and conveniently modulating the charge and/or discharge voltage enables one to obtain Tr=Tf under conditions of BEMF=0. If the power stage may function in linear AB-class, the condition is easily obtainable by actuating an initial calibration in which the condition Tr=Tf when BEMF=0 is forced by acting on the charge and/or discharge voltage. Once the charge and/or discharge voltage is found, which permits to obtain Tr=Tf, the measurements with BEMF>0 may be carried out, where the effects of BEMF on Tr+Tf will be minimized. In other words, the variations of Tr and Tf by the BEMF will be such as to minimize the parameter Tr+Tf used in computation.

Figures 6, 7:
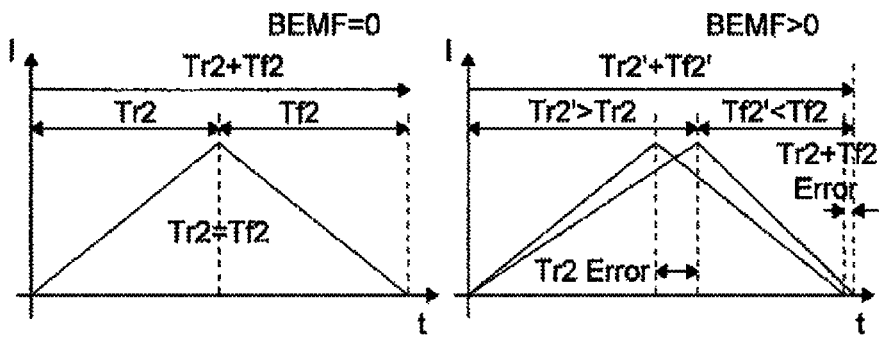
FIG. 6 shows the time diagrams of the rise and fall time of the current pulse I when BEMF=0 and with voltages Von and/or Voff being modulated to obtain Tr=Tf.
FIG. 7 shows the time diagrams of the rise and fall time of the current pulse I when BEMF>0 and with voltages Von and/or Voff modulated to obtain Tr=Tf.

FIG. 6 indicates an example of current impulse to which the compensation method of the BEMF has been applied, i.e., with the voltages Von and/or Voff modulated to obtain Tr=Tf by assuming that the charge and discharge of the current is linear. FIG. 6 depicts the current impulse in the absence of BEMF, characterized by a rise time Tr2 and by a fall time Tf2 when Tr2=Tf2; FIG. 7 depicts the same current impulse under conditions of BEMF>0 characterized by a rise time Tr2' and by a fall time Tf2' (Tr2'>Tf2'). FIG. 7 shows how the difference between Tr2 and Tr2' (Tr2_error) is much greater than the difference between Tr2+Tf2 and Tr2'+Tf2' (Tr2+Tf2_error). The effects of BEMF are thus significantly decreased by using the quantity Tr+Tf as a computation parameter instead of the simple Tr or Tf if a voltage Von and/or Voff is used such as to have Tr=Tf under conditions of BEMF=0.

Figure 8:
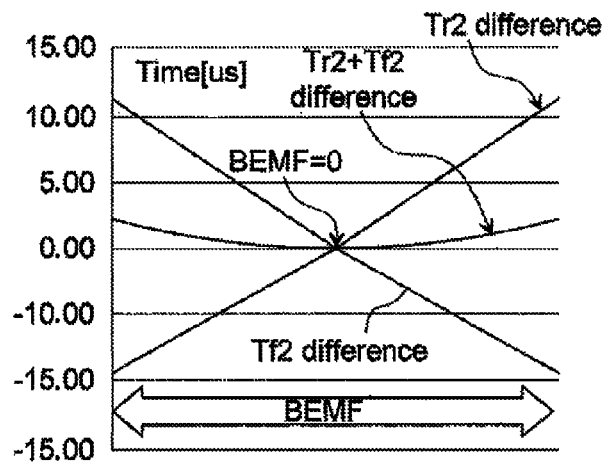
FIG. 8 shows the time diagrams of the differences of rise time period Tr, fall time periods Tf, and sum periods Tr+Tf when BEMF=0 and those when BEMF is other than zero referred to the current pulse I as a function of the BEMF and with voltages Von and/or Voff modulated to obtain Tr=Tf.

FIG. 8 depicts the graph with the differences pattern of the rise period Tr, fall period Tf, and sum Tr+Tf when BEMF=0 and those when BEMF is other than zero, according to the BEMF, if Von and/or Voff are modulated to obtain Tr=Tf. In the example, it is considered the case of function i/t of the linear load having a current charge time Tr=100 microseconds under conditions of BEMF=0. From the graph, the single variation of Tr2 and Tf2, indicated as Tr2_difference and Tf2_difference, is noted to be rather high whereas the variation of the sum Tr2+Tf2, indicated as Tr2+Tf2_difference, is smaller.

Figure 9:
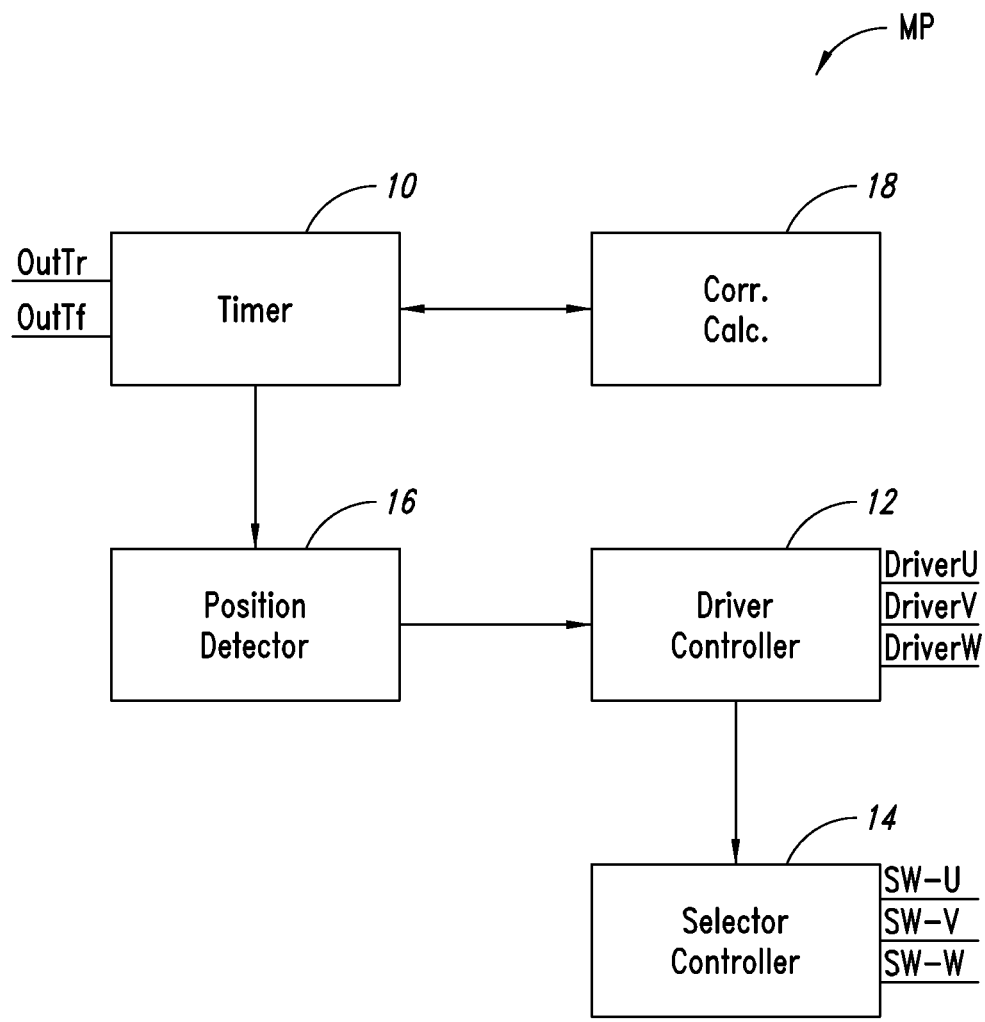
FIG. 9 is a block diagram of a controller according to one embodiment of the present disclosure.

In accordance with one embodiment of the disclosure shown in FIG. 9, the controller MP includes various functional modules that can be implemented by software/firmware modules of a processor, hardware circuits, and/or a combination of hardware and software. In particular, the controller MP includes a timer module 10 configured to determine the charging time Tr based on the signal OutTr produced by the comparator CompTr, the discharging time Tf based on the signal OutTf produced by the comparator CompTf, and the sum of the charge and discharge times. The controller MP also includes a driver controller 12 configured to control the drivers DriverU, DriverV, and DriverW, of the drive stages S, S2, S3, respectively, a selector controller 14 configured to control the selector Sel, and a position detector 16 configured to determine the position of the rotor of the brushless motor based on the time periods given by the addition of each rise time Tr and the fall time Tf when BEMF=0 The controller MP also comprises a correction calculator 18 configured to calculate a corrective factor K to be applied to Tf (or Tr), which permits to obtain the condition Tr=KTf (or Ktr=Tf). Once the corrective factor K has been determined and provided to the timer module 10, the timer module can determine and provide Tr+KTf (or Ktr+Tf) as a computation parameter to the position detector 16 for estimating the rotor position. Indeed, in most cases, the power stage is of the ON/OFF type (i.e., belongs to class D) and therefore the charge or discharge voltage may not be modulated as desired. Of course, one skilled in the art will recognize that the modules 10-18 could be implemented by separate elements or any and all of the modules could be combined into one or more combined modules or further divided into more modules that perform more specific functions.

Figure 10:
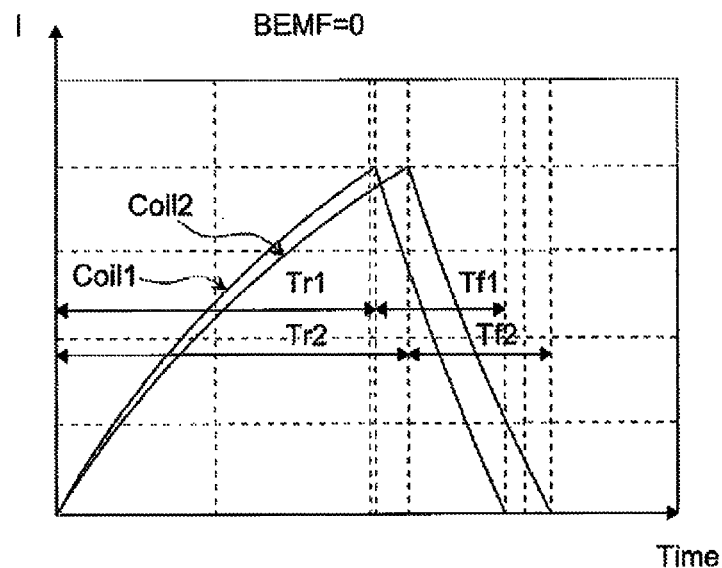
FIG. 10 shows the time diagrams of rise time Tr, fall time Tf, and sum Tr+Tf of a current impulse for a pair of windings at saturation and a pair of windings not at saturation when Von=VCC and Voff=−(VCC+2 Vbe) and BEMF=0 determined by means of an apparatus for detecting the position of a rotor of a brushless motor in accordance with a second embodiment of the present disclosure.

By way of example, FIG. 10 shows the two current impulses I which cross the windings of motor SM at maximum saturation conditions, for example in the phase U-V indicated by COIL_1, and at the minimum saturation conditions, in the phase V-U indicated by COIL_2, when BEMF=0, with the rotor aligned (or close to alignment) to the phase U-V. FIG. 10 considers a real load (not linearized) in which the inductance value varies by 10% due to the saturations introduced by the position of the rotor. In FIG. 10, the characteristic times may be extracted, which relate to the current impulse which passes through the winding with maximum saturation in the phase U-V, i.e., rise time Tr1, fall time Tf1, and sum Tr1+Tf1 thereof.

When Tr1=102 microseconds, Tf1=41.5 microseconds, Tr1+Tf1=143.5 microseconds, the result is K1=Tr1/Tf1=2.48=K and Ttot=Tr1+K1*Tf1=204 microseconds in the phase U-V indicated by COIL_1. Therefore, the corrective factor to be applied to Tf1 (in our example) is: K=K1=Tr1/Tf1=2.48.

As described above, again in FIG. 10, rise time Tr2, fall time Tf2, and their sum Tr2+Tf2 may be extracted, related to the current which passes through the winding with minimum saturation in the phase V-U and the corrective factor K2 is calculated: the result is Tr2=112 microseconds, Tf2=45 microseconds, Tr2+Tf2=157 microseconds and K2=Tr2/Tf2=2.48=K and Ttot=Tr2+K2*Tf2=224 microseconds. The corrective factor to be applied to Tf2 (in our example) is: K=K2=Tr2/Tf2=2.48. The corrective factor is equal to that previously found, whereby it is sufficient to calculate it only once according to the current which passes through the winding in any one of the phases U-V, U-W, V-W, V-U, W-U, W-V under conditions of BEMF=0.

Figure 11:
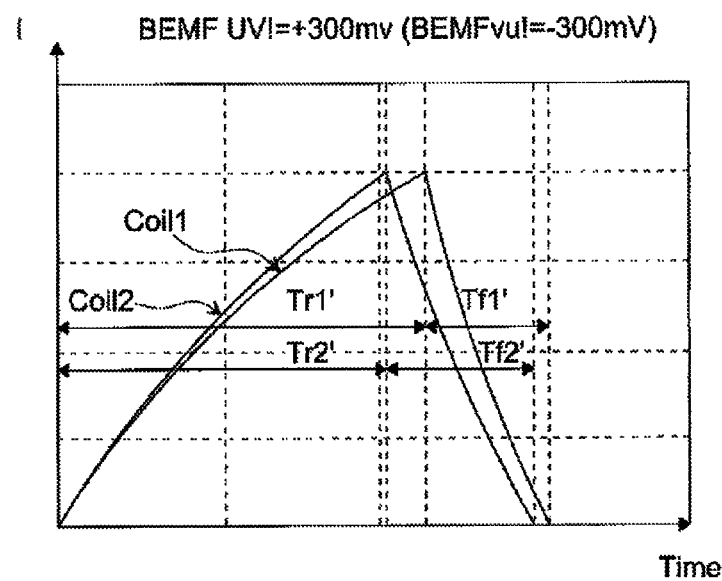
FIG. 11 shows the time diagrams of rise time Tr, fall time Tf and sum Tr+Tf of a current impulse for a pair of windings at saturation and a pair of windings not at saturation when Von=VCC and Voff=−(VCC+2 Vbe) and BEMF>0 determined by means of an apparatus for detecting the position of a rotor of a brushless motor in accordance with the second embodiment of the present disclosure.

If BEMF is other than zero (i.e., the motor SM is moving), the circumstance is modified as shown in FIG. 11, where the voltage BEMF is of a sign such as to oppose the power supply voltage VCC when exciting the saturated phase U-V and accordingly of sign such as to be added to the power supply voltage when exciting the non-saturated phase V-U. The effect will be a slow-down of the rise edge of the current circulating in the phase U-V, i.e., a greater rise time Tr, and a greater speed of the rise edge of the current circulating in the phase V-U, i.e., a smaller rise time Tr. The subject is reversed with regards to fall times Tf.

When BEMF=+300 mV in the phase U-V (BEMF=−300 mV in the phase V-U), the result is Tr1'=114 microseconds, Tf1'=40 microseconds, Tr1'+Tf1'=154 microseconds and using K=2.48, the result is Ttot=Tr1'+K*Tf1'=213 microseconds in the phase U-V indicated by COIL_1 and Tr2'=101 microseconds, Tf2'=47.7 microseconds, Tr2+Tf2=148.7 microseconds and using K=2.48, the result is Ttot=Tr2+K*Tf2=217 microseconds in the phase V-U indicated by COIL_2.

Thus, the presence of BEMF modifies the current impulses by making the rise edge of the current circulating in the windings at saturation in the phase U-V slower than the rise edge of the current circulating in the windings not at saturation in the phase V-U. An inductive sense procedure of known art which uses the parameter Tr as a computation parameter is thus not capable of ensuring the correct result in the presence of BEMF.

Figure 12:
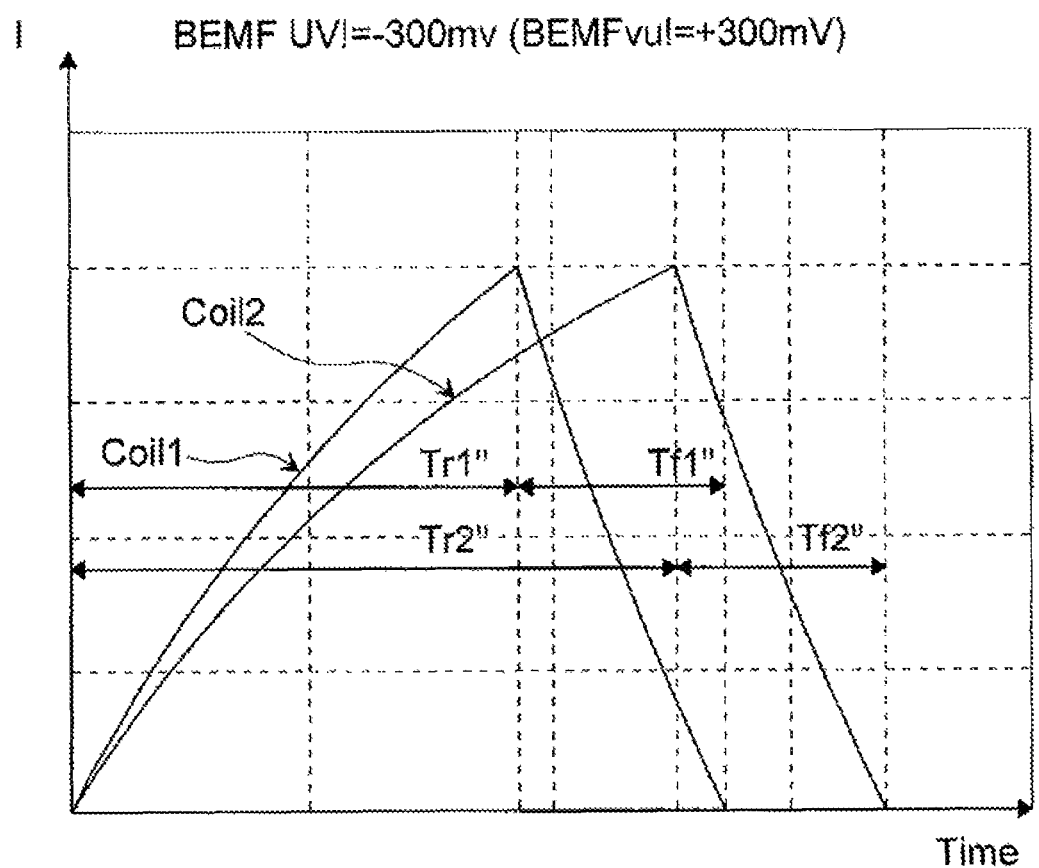
FIG. 12 shows the time diagrams of rise time Tr, fall time Tf and sum Tr+Tf of a current impulse for a pair of windings at saturation and a pair of windings not at saturation when Von=VCC and Voff=−(VCC+2 Vbe) and BEMF<0 determined by means of an apparatus for detecting the position of a rotor of a brushless motor in accordance with the second embodiment of the present disclosure.

If BEMF is other than zero (the motor moves) but has an opposite polarity to that previously described for FIG. 11, i.e., if the voltage BEMF is of sign such as to be added to the power supply voltage when exciting the saturated phase U-V and accordingly of sign such as to be subtracted from the power supply voltage when exciting the non-saturated phase V-U (FIG. 12). The effect will be greater speed of the rise edge of the current circulating in the phase U-V, i.e., a smaller rise time Tr, and a slow down of the rise edge of the current circulating in the phase V-U, i.e., a greater rise time Tr. The subject is reversed with regards to fall times Tf.

When the BEMF=−300 mV in the phase U-V (BEMF=+300 mV in the phase V-U), the result is Tr1"=92 microseconds, Tf1"=43 microseconds, Tr1"+Tf1"=135 microseconds and using K=2.48, the result is Ttot=Tr1"+K*Tf1"=198 microseconds in the phase U-V indicated by COIL_1 and Tr2"=125 microseconds, Tf2"=44 microseconds, Tr2"+Tf2"=169 microseconds and using K=2.48, the result is Ttot=Tr2"+K*Tf2"=234 microseconds in the phase V-U indicated by COIL_2.

By analyzing the data extrapolated from FIG. 10, Tr1<Tr2, Tf1<Tf2, (Tr1+Tf1)<(Tr2+Tf2) and (Tr1+KTf1)<(Tr2+KTf2), i.e., in the absence of BEMF all parameters are consistent and all parameters may be used in the computation of the rotor position.

By analyzing the data extrapolated from FIG. 11, Tr1'>Tr2' is inferred, which is not consistent with the expectations, Tf1'<Tf2' consistently with the expectations, (Tr1'+Tf1')>(Tr2'+Tf2') which is not consistent with the expectations, (Tr1'+KTf1')<(Tr2'+KTf2') consistently with the expectations. The effects of BEMF affect certain parameters which are thus not usable in the computation of the rotor position. Also even the parameter Tr+Tf is not capable of ensuring the expected result as instead the parameter Tr+KTf, ensures the expected result.

By analyzing the data extrapolated from FIG. 12, it is obtained Tr1"<Tr2" consistently with the expectations, Tf1"~=Tf2" which is not consistent with the expectations, (Tr1"+Tf1")<(Tr2"+Tf2") consistently with the expectations and (Tr1"+KTf1")<(Tr2"+KTf2") consistently with the expectations. Even in this case, the effects of BEMF affect certain parameters which are thus not usable in the computation of the rotor position. Thus, from the data extrapolated from FIGS. 10-12, the only parameter which is always consistent with the expectations is (Tr1"+KTf1")<(Tr2"+KTf2"). A similar result would have been obtained by modulating the discharge voltage according to the disclosure of the second embodiment but this would have required a power stage not operating in class D.

The use of the present disclosure thus permits to extend the functionality of the inductive sense procedure to rotation speeds which are higher than those usable in the known art systems.

In all the above-described embodiments of the disclosure and in their variants, the parameters used for estimating the rotor position are the times to reach certain current thresholds (Tr, Tf and others obtained by processing them). However, this is only one of the methods for parameterizing the current impulses which characterize the inductive sense procedure and which permit to implement the present disclosure. In general, any other parameter having a relationship with the current charge (therefore not necessarily Tr) and any other parameter having a relationship with the current discharge (therefore not necessarily Tf) may be used for implementing the present disclosure. Thereby, the present disclosure allows a "general parameter" related to the current charge to be at most equalized to the "general parameter" related to the current discharge (when BEMF=0), independently from the selected parameter, and both the parameters to be used in the computation for determining the rotor position.

In particular the present disclosure concerns the techniques of detecting the rotor position for carrying out the closed loop startup.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising;
an electric motor having a plurality of windings and a rotor;
a plurality of drive stages configured to produce a first current through a first pair of said windings and to discharge the first current;
a measuring circuit configured to measure a first time period between a starting instant of producing the first current in the first pair of windings and a final instant of discharging the first current from the first pair of windings, wherein said measuring circuit includes:
a charge measurement circuit configured to measure a charge time period until the first current reaches a threshold value; and
a discharge measurement circuit configured to measure a discharge time period during which the first current reaches a null value from the threshold value, said first time period corresponding to a sum of the charge time period and the discharge time period;
a rotor detector configured to detect a position of the rotor based at least in part on said measured first time period; and
a drive stage controller configured to cause the drive stages to apply voltages to said first pair of windings such that the charge time period is equal to the discharge time period.

2. An apparatus according to the claim 1, wherein said drive stages are configured to produce the first current by connecting the first pair of windings between a power supply voltage and ground.

3. An apparatus according to claim 2, wherein the drive stages are configured to produce the first current by applying a charge voltage, equal to the power supply voltage, to the first pair of windings, and are configured to discharge the first current by applying a discharge voltage, equal to the power supply voltage but with opposite polarity, to said first pair of windings.

4. An apparatus, comprising:
an electric motor having a plurality of windings and a rotor;
a plurality of drive stages configured to produce a first current through a first pair of said windings and to discharge the first current;
a measuring circuit configured to measure a first time period between a starting instant of producing the first current in the first pair of windings and a final instant of discharging the first current from the first pair of windings, wherein said measuring circuit includes:
a charge measurement circuit configured to measure a charge time period until the first current reaches a threshold value; and
a discharge measurement circuit configured to measure a discharge time period during which the first current reaches a null value from the threshold value, said first time period corresponding to a sum of the charge time period and the discharge time period;
a rotor detector configured to detect a position of the rotor based at least in part on said measured first time period; and
a corrective factor calculator configured to determine and apply a corrective factor to the charge time period or to the discharge time period such that either the charge time period equals said corrective factor multiplied by the discharge time period, or the discharge time period equals said corrective factor multiplied by the charge time period, wherein the corrective factor is a numerical value other than zero.

5. An apparatus according to claim 4, wherein each of the drive stages includes a half-bridge that includes first and second transistors and first and second current recirculating diodes, respectively, the apparatus comprising a drive stage control configured to cause the drive stages to apply a voltage equal to a power supply voltage to said first pair of windings while producing said first current, and configured to cause the drive stages to apply to the first pair of windings a voltage equal to a sum of the power supply voltage and twice a voltage at terminals of the recirculating diodes while discharging the first pair of windings.

6. An apparatus, comprising:
- an electric motor having a plurality of windings and a rotor;
- a plurality of drive stages configured to produce a first current through a first pair of said windings and to discharge the first current;
- a measuring circuit configured to measure a first time period between a starting instant of producing the first current in the first pair of windings and a final instant of discharging the first current from the first pair of windings, wherein said measuring circuit includes:
  - a charge measurement circuit configured to measure a charge time period until the first current reaches a threshold value; and
  - a discharge measurement circuit configured to measure a discharge time period during which the first current reaches a null value from the threshold value, said first time period corresponding to a sum of the charge time period and the discharge time period; and
- a rotor detector configured to detect a position of the rotor based at least in part on said measured first time period, wherein the drive stages respectively include first, second, and third half-bridges, each half-bridge including first and second transistors connected to each other at a central point of the half-bridge, wherein the measuring circuit includes:
- a first comparator having a first input, a second input, and an output, the first input being coupled to a power supply voltage;
- a selector configured to selectively connect the second input of the first comparator to the central points of said half-bridges, respectively;
- a second comparator configured to compare a voltage corresponding to the first current with a reference voltage; and
- a control circuit configured to receive outputs of said first and second comparators and determine the first time period as a function of the outputs of the comparators.

7. An apparatus according to claim 6, wherein:
the plurality of windings includes three windings;
the first, second, and third half-bridges are configured to sequentially produce the first current and second, third, fourth, fifth, and sixth currents through said windings and to sequentially discharge the first, second, third, fourth, fifth, and sixth currents;
the plurality of drive stages is configured to produce the first current in a first direction through the first pair of the windings, the second current in the first direction through a second pair of the windings, the third current in the first direction through a third pair of the windings, the fourth current in a second direction through the first pair of the windings, the fifth current in the second direction through the second pair of the windings, and the sixth current in the second direction through the third pair of the windings;
the measuring circuit is configured to measure a second time period between a starting instant of producing the second current and a final instant of discharging the second current from the second pair of windings, measure a third time period between a starting instant of producing the third current and a final instant of discharging the third current from the third pair of windings, measure a fourth time period between a starting instant of producing the fourth current and a final instant of discharging the fourth current from the first pair of windings, measure a fifth time period between a starting instant of producing the fifth current and a final instant of discharging the fifth current from the second pair of windings, measure a sixth time period between a starting instant of producing the sixth current and a final instant of discharging the sixth current from the third pair of windings; and
the rotor detector is configured to detect positions of the rotor based on said measured first, second, third, fourth, fifth, and sixth time periods.

8. A method for detecting a position of a rotor of an electric motor having a plurality of windings, comprising:
- producing a first current through a first pair of the windings by connecting the first pair of windings between first and second reference voltages according to a first current path;
- discharging said first pair of windings through a second current path;
- measuring a first time period between a starting instant of connecting the first pair of windings between the first and second reference voltages and a final instant of discharging the first pair of windings; and
- detecting the position of said rotor based at least in part on said measured first time period, wherein producing the first current includes applying a charge voltage to said first pair of windings and discharging the first current includes applying a discharge voltage such that a charge time period of the first time period is equal to a discharge time period of the first time period.

9. A method according to claim 8, wherein measuring the first time period includes:
- measuring the charge time period until the first current reaches a threshold value; and
- measuring the discharge time period during which the first current reaches a null value from the threshold value, the first time period corresponding to a sum of the charge time period and the discharge time period.

10. A method according to claim 8, comprising;
- producing a second current through a second pair of the windings by connecting the second pair of windings between the first and second reference voltages according to a third current path;
- discharging said second current through a fourth current path;
- measuring a second time period between a starting instant of producing the second current and a final instant of discharging the second current;
- producing a third current through a third pair of the windings by connecting the third pair of windings between the first and second reference voltages according to a fifth current path;
- discharging said third current through a sixth current path;
- measuring a third time period between a starting instant of producing the third current and a final instant of discharging the third current;
- producing a fourth current through the first pair of the windings by connecting the first pair of windings between the first and second reference voltages according to a seventh current path;
- discharging said fourth current through an eighth current path;
- measuring a fourth time period between a starting instant of producing the fourth current and a final instant of discharging the fourth current;

producing a fifth current through the second pair of the windings by connecting the second pair of windings between the first and second reference voltages according to a ninth current path;

discharging said fifth current through a tenth current path;

measuring a fifth time period between a starting instant of producing the fifth current and a final instant of discharging the fifth current;

producing a sixth current through the third pair of the windings by connecting the third pair of windings between the first and second reference voltages according to an eleventh current path;

discharging said sixth current through a twelfth current path; and measuring a sixth time period between a starting instant of producing the sixth current and a final instant of discharging the sixth current, wherein detecting the position of said rotor includes detecting positions of the rotor based at least in part on said measured first, second, third, fourth, fifth, and sixth time period.

11. A method for detecting a position of a rotor of an electric motor having a plurality of windings, comprising:

producing a first current through a first pair of the windings by connecting the first pair of windings between first and second reference voltages according to a first current path;

discharging said first pair of windings through a second current path;

measuring a first time period between a starting instant of connecting the first pair of windings between the first and second reference voltages and a final instant of discharging the first pair of windings;

detecting the position of said rotor based at least in part on said measured first time period; and determining and applying a corrective factor to a charge time period or to a discharge time period such that either the charge time period equals said corrective factor multiplied by the discharge time period, or the discharge time period equals said corrective factor multiplied by the charge time period, wherein the corrective factor is a numerical value other than zero.

12. A method according to claim 11, wherein producing the first current includes applying a charge voltage, equal to a power supply voltage, to the first pair of windings, and discharging the first current includes applying a discharge voltage, equal to the power supply voltage but with opposite polarity, to said first pairs of windings.

13. An apparatus for detecting a position of a rotor of an electric motor having a plurality of windings, the apparatus comprising:

a plurality of drive stages configured to produce a first current through a first pair of said windings and to discharge the first current;

a measuring circuit configured to measure a first time period between a starting instant of producing the first current in the first pair of windings and a final instant of discharging the first current from the first pair of windings, wherein said measuring circuit includes:

a charge measurement circuit configured to measure a charge time period until the current reaches a threshold value; and a discharge measurement circuit configured to measure a discharge time period during which the first current reaches a null value from the threshold value, said first time period corresponding to a sum of the charge time period and the discharge time period;

a rotor detector configured to detect a position of the rotor based at least in part on said measured first time period; and a drive stage controller configured to cause the drive stages to apply voltages to said first pair of windings such that the charge time period is equal to the discharge time period.

14. An apparatus according to the claim 13, wherein said drive stages are configured to produce the first current by connecting the first pair of windings between a power supply voltage and ground.

15. An apparatus according to claim 14, wherein the drive stages are configured to produce the first current by applying a charge voltage, equal to the power supply voltage, to the first pair of windings, and are configured to discharge the first current by applying a discharge voltage, equal to the power supply voltage but with opposite polarity, to said first pair of windings.

16. An apparatus for detecting a position of a rotor of an electric motor having a plurality of windings, the apparatus comprising:

a plurality of drive stages configured to produce a first current through a first pair of said windings and to discharge the first current;

a measuring circuit configured to measure a first time period between a starting instant of producing the first current in the first pair of windings and a final instant of discharging the first current from the first pair of windings;

a rotor detector configured to detect a position of the rotor based at least in part on said measured first time period; and a corrective factor calculator configured to determine and apply a corrective factor to a charge time period or to a discharge time period such that either the charge time period equals said corrective factor multiplied by the discharge time period, or the discharge time period equals said factor corrective multiplied by the charge time period, wherein the corrective factor is a numerical value other than zero.

17. An apparatus according to claim 16, wherein each of the drive stages includes a half-bridge that includes first and second transistors and first and second current recirculating diodes, respectively, the apparatus comprising a drive stage control configured to cause the drive stages to apply a voltage equal to a power supply voltage to said first pair of windings while producing said first current, and configured to cause the drive stages to apply to the first pair of windings a voltage equal to a sum of the power supply voltage and twice a voltage at terminals of the recirculating diodes while discharging the first pair of windings.

18. An apparatus for detecting a position of a rotor of an electric motor having a plurality of windings, the apparatus comprising:

a plurality of drive stages configured to produce a first current through a first pair of said windings and to discharge the first current;

a measuring circuit configured to measure a first time period between a starting instant of producing the first current in the first pair of windings and a final instant of discharging the first current from the first pair of windings; and a rotor detector configured to detect a position of the rotor based at least in part on said measured first time period, wherein the drive stages respectively include first, second, and third half-bridges, each half-bridge including first and second transistors connected to each other at a central point of the half-bridge, wherein the measuring circuit includes:
a first comparator having a first input, a second input, and an output, the first input being coupled to a power supply voltage;
a selector configured to selectively connect the second input of the first comparator to the central points of said half-bridges, respectively;
a second comparator configured to compare a voltage corresponding to the first current with a reference voltage; and
a control circuit configured to receive outputs of said first and second comparators and determine the first time period as a function of the outputs of the comparators.

19. An apparatus according to claim 18, wherein;
the first, second, and third half-bridges are configured to sequentially produce the first current and second, third, fourth, fifth, and sixth currents through said windings and to sequentially discharge the first, second, third, fourth, fifth, and sixth currents;
the first current is produced in a first direction through the first pair of the windings, the second current is produced in the first direction through a second pair of the windings, the third current is produced in the first direction through a third pair of the windings, the fourth current is produced in a second direction through the first pair of the windings, the fifth current is produced in the second direction through the second pair of the windings, and the sixth current is produced in the second direction through the third pair of the windings;
the measuring circuit configured to measure a second time period between a starting instant of producing the second current and a final instant of discharging the second current from the second pair of windings, measure a third time period between a starting instant of producing the third current and a final instant of discharging the third current from the third pair of windings, measure a fourth time period between a starting instant of producing the fourth current and a final instant of discharging the fourth current from the first pair of windings, measure a fifth time period between a starting instant of producing the fifth current and a final instant of discharging the fifth current from the second pair of windings, measure a sixth time period between a starting instant of producing the sixth current and a final instant of discharging the sixth current from the third pair of windings; and
the rotor detector is configured to detect positions of the rotor based on said measured first, second, third, fourth, fifth, and sixth time periods.

\* \* \* \* \*